(12) United States Patent
Sheppard et al.

(10) Patent No.: US 10,382,818 B2
(45) Date of Patent: Aug. 13, 2019

(54) METHODS AND APPARATUS TO DETERMINE SYNTHETIC RESPONDENT LEVEL DATA USING CONSTRAINED MARKOV CHAINS

(71) Applicant: The Nielsen Company (US), LLC, New York, NY (US)

(72) Inventors: Michael Sheppard, Holland, MI (US); Jonathan Sullivan, Hurricane, UT (US); Michael D. Morgan, Bartlett, IL (US); Balachander Shankar, Tampa, FL (US); Edward Murphy, North Stonington, CT (US); Frank Downing, Orchard Park, NY (US)

(73) Assignee: The Nielson Company (US), LLC, New York, NY (US)

( * ) Notice: Subject to any disclaimer, the term of this patent is extended or adjusted under 35 U.S.C. 154(b) by 0 days.

(21) Appl. No.: 15/635,153

(22) Filed: Jun. 27, 2017

(65) Prior Publication Data

US 2018/0376198 A1 Dec. 27, 2018

(51) Int. Cl.
| H04N 21/44 | (2011.01) |
| H04N 21/442 | (2011.01) |
| H04N 21/81 | (2011.01) |
| H04N 21/458 | (2011.01) |
| H04N 21/845 | (2011.01) |
| H04N 21/258 | (2011.01) |
| H04N 21/262 | (2011.01) |

(52) U.S. Cl.
CPC . *H04N 21/44213* (2013.01); *H04N 21/25883* (2013.01); *H04N 21/262* (2013.01); *H04N 21/458* (2013.01); *H04N 21/812* (2013.01); *H04N 21/8456* (2013.01)

(58) Field of Classification Search
None
See application file for complete search history.

(56) References Cited

U.S. PATENT DOCUMENTS

| 5,956,692 A | 9/1999 | Foley |
| 6,775,663 B1 | 8/2004 | Kim |
| 7,746,272 B2 | 6/2010 | Vollath |

(Continued)

FOREIGN PATENT DOCUMENTS

WO 2014210597 12/2014

OTHER PUBLICATIONS

Huckett et al., "Combining Methods to Create Synthetic Microdata: Quantile Regression, Hot Deck, and Rank Swapping," Research Gate, Apr. 2008, 11 pages.

(Continued)

*Primary Examiner* — Cai Chen
(74) *Attorney, Agent, or Firm* — Hanley, Flight & Zimmerman, LLC

(57) ABSTRACT

Methods, apparatus, systems, and articles of manufacture are disclosed to generate synthetic respondent level data. An example method includes generating a first and second synthetic panel corresponding to a first duration of time based on a seed panel and first duration constraints; generating synthetic respondent level data corresponding to a second duration of time by linking synthetic panelists from the first synthetic panel to the second synthetic panel; and generating an output file based on the synthetic respondent level data.

20 Claims, 8 Drawing Sheets

(56) References Cited

U.S. PATENT DOCUMENTS

| | | | |
|---|---|---|---|
| 7,954,120 | B2 | 5/2011 | Roberts et al. |
| 8,112,301 | B2 | 2/2012 | Harvey et al. |
| 8,149,162 | B1 | 4/2012 | Pauls |
| 8,619,892 | B2 | 12/2013 | Vetter et al. |
| 9,111,186 | B2 | 8/2015 | Blasinski et al. |
| 9,224,094 | B2 | 12/2015 | Oliver et al. |
| 9,236,962 | B2 | 1/2016 | Hawkins et al. |
| 9,420,320 | B2 | 8/2016 | Doe |
| 2002/0123928 | A1* | 9/2002 | Eldering ............... G06Q 30/02 705/14.52 |
| 2004/0001538 | A1 | 1/2004 | Garrett |
| 2008/0228543 | A1 | 9/2008 | Doe |
| 2008/0300965 | A1 | 12/2008 | Doe |
| 2008/0313017 | A1 | 12/2008 | Totten |
| 2010/0191723 | A1 | 7/2010 | Perez et al. |
| 2012/0023522 | A1 | 1/2012 | Anderson et al. |
| 2012/0052930 | A1 | 3/2012 | McGucken |
| 2012/0072940 | A1 | 3/2012 | Fuhrer |
| 2012/0110027 | A1 | 5/2012 | Falcon |
| 2012/0254911 | A1 | 10/2012 | Doe |
| 2013/0198125 | A1 | 8/2013 | Oliver et al. |
| 2013/0290233 | A1 | 10/2013 | Ferren et al. |
| 2014/0101685 | A1 | 4/2014 | Kitts et al. |
| 2015/0180989 | A1* | 6/2015 | Seth .................. G06Q 30/0276 709/224 |
| 2015/0186403 | A1 | 7/2015 | Srivastava et al. |
| 2016/0012314 | A1 | 1/2016 | Ramamurthy et al. |
| 2016/0086208 | A1 | 3/2016 | Oliver et al. |
| 2016/0165277 | A1 | 6/2016 | Kirillov et al. |
| 2016/0232563 | A1 | 8/2016 | Perez et al. |
| 2016/0249098 | A1 | 8/2016 | Pecjak et al. |
| 2016/0269783 | A1 | 9/2016 | Mowrer et al. |
| 2016/0323616 | A1 | 11/2016 | Doe |
| 2018/0073933 | A1 | 3/2018 | Keskin et al. |

OTHER PUBLICATIONS

Golub et al., "Linear Least Squares and Quadratic Programming," Technical Report No. CS 134, Stanford University, Computer Science Department, May 1969, 38 pages.

Charles L. Byrne, "Iterative Algorithms in Inverse Problems," Apr. 25, 2006, 347 pages.

Charles L. Byrne, "Applied Iterative Methods," Jan. 23, 2007, 396 pages.

Bourguignon et al., "On the Construction of Synthetic Panels," Oct. 2015, 42 pages.

Marno Verbeek, "Pseudo-Panels and Repeated Cross-Sections," The Econometrics of Panel Data, Springer-Verlag Berlin Heidelberg 2008, 15 pages.

P.J.G. Teunissen, "Least-Squares Estimation of the Integer GPS Ambiguities," Delft University of Technology, Department of the Geodetic Engineering, Aug. 1993, 16 pages.

United States Patent and Trademark Office, "Non-Final Office action," issued in connection with U.S. Appl. No. 15/445,543, dated Jan. 11, 2018, 20 pages.

United States Patent and Trademark Office, "Non-Final Office action" issued in connection with U.S. Appl. No. 15/445,530, dated Apr. 11, 2018, 10 pages.

United States Patent and Trademark Office, "Non-Final Office Action," issued in connection with U.S. Appl. No. 15/445,557, dated Jun. 29, 2018, 12 pages.

United States Patent and Trademark Office, "Final Office Action" issued in connection with U.S. Appl. No. 15/445,543, dated Aug. 3, 2018, 16 pages.

United States Patent and Trademark Office, "Non-Final Office Action," issued in connection with U.S. Appl. No. 15/619,257, dated Jun. 15, 2018, 16 pages.

United States Patent and Trademark Office, "Final Office Action" issued in connection with U.S. Appl. No. 15/445,557, dated Dec. 27, 2018, 10 pages.

United States Patent and Trademark Office, "Final Office Action" issued in connection with U.S. Appl. No. 15/619,257, dated Jan. 18, 2019, 18 pages.

United States Patent and Trademark Office, "Notice of Allowance," issued in connection with U.S. Appl. No. 15/445,530, dated Jan. 2, 2019, 8 pages. (Resubmitted to include a page that was inadvertently omitted from document submitted with the IDS dated Mar. 19, 2019.).

United States Patent and Trademark Office, "Non-Final Office Action," issued in connection with U.S. Appl. No. 15/445,543, dated Jan. 8, 2019, 15 pages.

United States Patent and Trademark Office, "Notice of Allowance," issued in connection with U.S. Appl. No. 15/445,530, dated Jan. 2, 2019, 7 pages.

United States Patent and Trademark Office, "Notice of Allowance," issued in connection with U.S. Appl. No. 15/445,557, dated Apr. 15, 2019, 8 pages.

United States Patent and Trademark Office, "Notice of Allowance," issued in connection with U.S. Appl. No. 15/445,530, dated May 3, 2019, 5 pages.

* cited by examiner

METHODS AND APPARATUS TO DETERMINE SYNTHETIC RESPONDENT LEVEL DATA USING CONSTRAINED MARKOV CHAINS

FIELD OF THE DISCLOSURE

This disclosure relates generally to media audience measurement, and, more particularly, to methods and apparatus to determine synthetic respondent level data using constrained Markov chains.

BACKGROUND

Determining a size and demographic of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a plurality of media consumers (often called panelists) to cooperate in an audience measurement study (often called a panel) for a predefined length of time. In some examples, the audience measurement entity obtains (e.g., directly, or indirectly via a service provider) return path data from media presentation devices (e.g., set-top boxes) that identifies tuning data for the respective media presentation devices. In such examples, the audience measurement entity models and/or assigns viewers based on the return path data. The media consumption habits and demographic data associated with these enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

DETAILED DESCRIPTION

Figure 1:
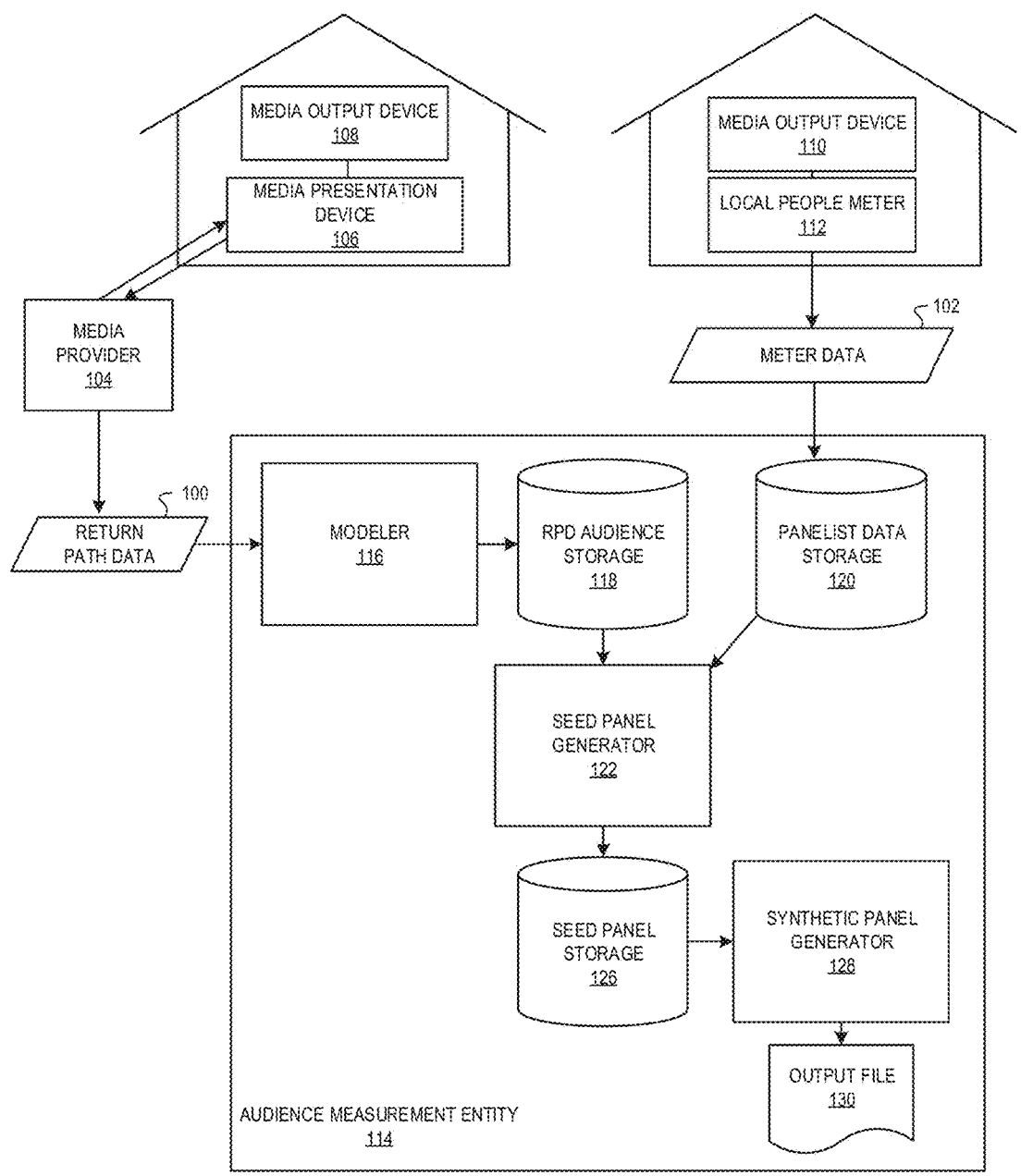
FIG. 1 is a block diagram of an example environment in which return path data and meter data are collected from media presentation locations and are analyzed by an example audience measurement entity to generate an example seed panel and generate example synthetic respondent level data based on the example seed panel in accordance with the teachings of this disclosure.

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, a media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over-the-top service provider, a music service provider, a movie service provider, a streaming media provider, etc.) or purchased by a consumer may contain processing capabilities to monitor, store, and transmit tuning data (e.g., which television channels are tuned by the media presentation device at a particular time) back to the service provider, which may provide at some of the tuning data (e.g., after aggregation and/or other post-processing) to an audience measurement entity (e.g., The Nielsen Company (US), LLC.) to analyze media presentation activity. Data transmitted from a media presentation device back to a service provider providing the media (which may then aggregate and provide the return path data to an audience measurement entity) is herein referred to as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data (e.g., demographic data) related to the user viewing the media corresponding to the media presentation device. Accordingly, return path data may not be associated with particular viewers, demographics, locations, etc.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a plurality of LPMs monitoring a plurality of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

Return path data provides valuable media exposure data, including media exposure data in locations where no panel data is available. However, return path data typically contains tuning data in the aggregate. Accordingly, return path data usually does not include respondent level data such as, but not limited to, detailed data relating to audience demographics and/or viewing data broken up into margins (e.g., quarter hours). Examples disclosed herein alleviate the lack of respondent level data in return path data by leveraging the respondent level data obtained from a panel of monitored panelists. Using examples disclosed herein, synthetic respondent level data corresponding to a group of synthetic, or virtual, panelists may be generated to correspond to the return path data, thereby increasing the value of return path data to a customer (e.g., of an advertising company).

Examples disclosed herein process the collected and/or aggregated metering data for markets where a panel is maintained and collect and/or aggregate return path data for markets where a panel is not maintained to generate a seed panel. A seed panel is a synthetic panel including monitored panelists and/or any other users (e.g., in which demographic data is known) selected to correspond to return path data homes (e.g., in-market return path data) and regional panel homes (e.g., over the air only panelists) and used as the basis for generation of synthetic respondent level data (e.g., representative of a group of synthetic/virtual panelists) corresponding to the return path data. These monitored panelists are selected from a panel (e.g., a national panel of metered users) based on a regional proximity to a designated market area, a similarity between demographics of the monitored panelist and demographics of the return path data audience location, household media characteristics (e.g., how the households receive television signals (cable, satellite, over-the-air radio, etc.)), a similarity between media consumption of the monitored panelists and the return path data audience, etc. As used herein, a return path data audience is viewer assigned return path data associated with a population (e.g., a universe or users) and/or location. As used herein, a seed panelist is a monitored panelist that has been selected to be included in a seed panel. As used herein, synthetic respondent level data or respondent level data is processed viewing data at the level of individual respondents. Synthetic respondent level data may include complete time records (e.g., at the quarter hour level, hour level, etc.) across each broadcasting day of all viewing sessions by every family member and guest on all metered media output devices in a home including the demographic data. As used herein, designated market area is a geographical area that defines a media market where synthetic respondent level data is produced.

Once a seed panel has been generated, examples disclosed herein adjust the seed panel to satisfy constraints (e.g., daily target reach, weekly target reach, monthly reach, etc.). As used herein, reach is a cumulative percentage or total of a population that has been counted as a viewer of media at least once during a specified time interval (e.g., daily, weekly, monthly, etc.). Examples disclosed herein generate transition matrices based on seed panel data. The transition matrix includes transition data corresponding to the likelihood (e.g., probability) that a panelist will switch from one program, channel, etc., to another within a quarter hour. Examples disclosed herein generate synthetic panels corresponding to a first duration of time (e.g., aa daily panel) by generating viewing data according to the transition matrices. To satisfy a target reach corresponding to known aggregate data for the day, examples disclosed herein weigh the viewing data of the synethic panelists based on the target reach (such as the target reach represented by the aggregate return path data) until the target reach is satisfied. For example, if the target reach (e.g., corresponding to a reach reflected in the aggregate return path data) is 250,000 viewers exposed to a first program during a first duration of time and 300,000 of the generated seed panelist were exposed to the first program during the first duration of time, examples disclosed herein generate synthetic panelist data based on the seed panel to reduce the synthetic reach (e.g., 300,000) to a rating closer to the target reach (e.g., 250,000). In some examples, to select synthetic panelists that are a better fit for the constraints (e.g., reaches), examples disclosed herein remove synthetic panelists from the daily synthetic panel whose weights are below a threshold value.

Further, examples disclosed herein generate synthetic respondent level data for extended durations of time (e.g., longer than the first duration) by gathering daily synthetic panels corresponding to the extended duration of time and linking the panelists across the daily panelist to satisfy extended constraints. Examples disclosed herein generate an output file including synthetic respondent level data corresponding at least one of daily synthetic respondent level panel, weekly synthetic respondent level data, monthly synthetic respondent level data, etc. Using examples disclosed herein, consistent respondent level data is generated that satisfy various targets, thereby providing more accurate universe estimations.

FIG. 1 is a block diagram of an environment in which example return path data 100 and example meter data 102 are collected to generate synthetic respondent level data based on a generated seed panel. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example modeler 116, an example return path data (RPD) audience storage 118, an example panelist data storage 120, an example seed panel generator 122, an example station data storage 124, an example seed panel storage 126, an example synthetic panel generator 128, and an example output file 130.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc., based on the tuning of the example media presentation device 106. For example, the media presentation device 106 may be a set-top box. Additionally or alternatively, the example media presentation device 106 may be an over-the-top device, a video game console, a digital video recorder (DVR), a digital versatile disc (DVD) player, a receiver, a router, a server, a computer, a mobile device, a smart television, and/or any device that receives media from a service provider. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 to the example media provider 104. The example return path data 100 includes the tuning data and/or data corresponding to the example media provider 104 (e.g., data in the aggregate). Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 (e.g., after post-processing, such as aggregation, obfuscation, etc., to remove personal identification information (PII) data) from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity(ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data. The example audience measurement entity 114 includes the example return path data audience storage 118 (e.g., a database) and the example panelist data storage 120 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna, which may not be limited to receiving media from just one media provider. In the illustrated example of FIG. 1, the media output device 110 corresponds to one or more monitored panelists. The example LPM 112 monitors panelist exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable to present media to a user. The LPM 112 may be a portable people meter, a cell phone, a computing device, a sensor, and/or any other device capable of metering (e.g., monitoring) user exposure to media. In some examples, a media presentation location may include a plurality of LPMs 112. In such examples, the plurality of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 (e.g., after post-processing) of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet, a digital subscriber line (DSL), a telephone line, a coaxial cable, or any wireless connection, etc.

The example modeler 116 of the example AME 114 of FIG. 1 collects the example return path data 100 corresponding to the example media presentation device(s) 106. As described above, the example return path data 100 includes tuning data of the example media presentation device 106. However, the example return path data 100 may not include specific data identifying any information relating to the audience of the example media output device 108. The example modeler 116 models such audience information. For example, the modeler 116 may assign and/or model virtual users to augment the example return path data 100, thereby generating audience (e.g., viewer or listener) assigned return path data. The example modeler 116 outputs the audience assigned return path data to the example return path data audience storage 118.

The example seed panel generator 122 of FIG. 1 gathers (A) the audience assigned return path data from the example return path data audience storage 118, (B) the example meter data 102 from the example panelist data storage 120, (C) and station data from the example station data storage 124 to generate a seed panel. As explained above, a seed panel is a panel including synthetic respondent level data obtained from monitored panelists corresponding to the LPM(s) 112, which are selected based on a return path data audience and/or homes and regional panel audience and/or homes that are not covered by return path data. The seed panelists are selected to represent the entire market. The example seed panel generator 122 assigns geography and income data to the persons and/or homes corresponding to the audience assigned return path data and the meter data 102. The example seed panel generator 122 initiates the seed panel by selecting monitored panelists to be representative of the viewer/geography/income assigned return path data audience. For example, a monitored panelist may be selected based on a similarity between (A) the location of the monitored panelist and the location of a return path data audience member, (B) demographics corresponding to the location of the return path data audience member and the demographics of the monitored panelist, (C) media viewing characteristics of the return path data audience and the monitored panelist, etc.

The example station data storage 124 stores data related to station receivability by county. The example seed panel generator 122 uses the station data to calculate the station receivability for over the air homes. In some examples, the seed panel generator 122 filters the gathered seed panelists to collect attributes of interest at the person level and/or the household level. Attributes of interest at the person level may include age, gender, ethnicity, nationality, race, etc., and attributes at the household level may include head of household data, cable data, single set data, Alternate Delivery System (ADS) data, county data, metro data, income, zip code, number of televisions, pay service data, etc. The example seed panel generator 122 weights the seed panelists according to the universe estimate(s) of the designated market area. The universe estimate is an estimate of the total number of users in a universe of users (e.g., total number of television viewers). In some examples, the universe estimate is broken down at the demographic level. In some examples, when out-of-tab seed panelists exist, the example seed panel generator 122 donates viewing based on a donor pool of seed panelists and/or monitored panelists of similar demographics. A seed panelist is out-of-tab when, for example, the panelist's LPM 112 is off, broken, and/or otherwise faulty. Additionally, the example seed panel generator 122 may replicate and/or down-sample seed panelists according to a replication parameter to increase and/or decrease the degrees of freedom of the final seed panel. The example seed panel generator 122 replicates seed panelists by splitting seed panelists into two or more seed panelists whose weight is distributed among the two representative seed panelists. The example seed panel generator 122 down-samples the seed panelists by combining demographically similar seed panelists by combining the weight of the two or more seed panelists. The example seed panel generator 122 stores the final seed panel in the example seed panel storage 126.

The example synthetic panel generator 128 of FIG. 1 generates a synthetic panel from the seed panel generated by the example seed panel generator 122 to satisfy target reach constraints (e.g., daily, weekly, monthly, etc.) corresponding to the available (e.g., input) aggregate data related to media. To generate a synthetic panel for a first duration of time (e.g., a day), the synthetic panel generator 128 generates a transition matrix representative of the probability of panelists changing from first media (e.g., a first channel, program, network, etc.) to second media (e.g., a second channel, program, network, etc.) for different quarter hours of the day. In some examples, the transition matrix may be broken up into multiple transition matrices corresponding to multiple demographics to identify the demographics of the synthetic panelists. The example synthetic panel generator 128 generates viewing data for the seed panelists based on the transition matrices. The example synthetic panel generator 128 performs an iterative proportional fitting operation to generate weights for the seed panelists based on first duration (e.g., daily) constraints. The example synthetic panel generator 128 reduces the seed panel to a number of daily synthetic panelists by removing any seed panelist whose weight is below a minimum weight threshold. In this manner, the example synthetic panel generator 128 generates a daily synthetic panel that satisfies the daily constraints. The daily synthetic panel includes synthetic respondent level data corresponding to the day.

Additionally, to generate a synthetic panel including synthetic respondent level data for a second duration of time (e.g., a week, a month, etc.) longer than the first duration of time (e.g., a day), the example synthetic panel generator 128 of FIG. 1 gathers the daily synthetic panels for days corresponding to the second duration of time and generates a synthetic panel for the longer duration by linking the daily synthetic panelists across the second duration of time. For example, if the example synthetic panel generator 128 of FIG. 1 is generating a monthly synthetic panel, the synthetic panel generator 128 gathers the generated daily synthetic panels for days corresponding to the month. However, the panelists included in daily synthetic panels vary for different days. For example, different days may include a different order of synthetic panelists and/or completely different synthetic panelists. Accordingly, the example synthetic panel generator 128 links daily synthetic panels across all days in the second duration (e.g., the month), regardless of whether a linked panelist is the really the same panelist. To optimize or otherwise improve the synthetic panelist links, the example synthetic panel generator 128 links panelists using a Markov chain for different days to best match the monthly constraints. The example synthetic panel generator 128 is further described below in conjunction with FIGS. 2-4.

The example output file 130 of FIG. 1 includes the generated synthetic panel (e.g., daily, weekly, monthly, etc.) including the viewing data of the generated synthetic panel. Additionally, the output file 130 may include detailed demographic data of the synthetic panel, synthetic respondent level attributes, quarter hour ratings calculated from the synthetic respondent level data, daypart ratings calculated from the synthetic respondent level data, daypart reach calculated from the synthetic respondent level data, etc. Such data may be used to generate a report and/or may be further processed by a device (e.g., to estimate data related to the universe of users).

Figure 2:
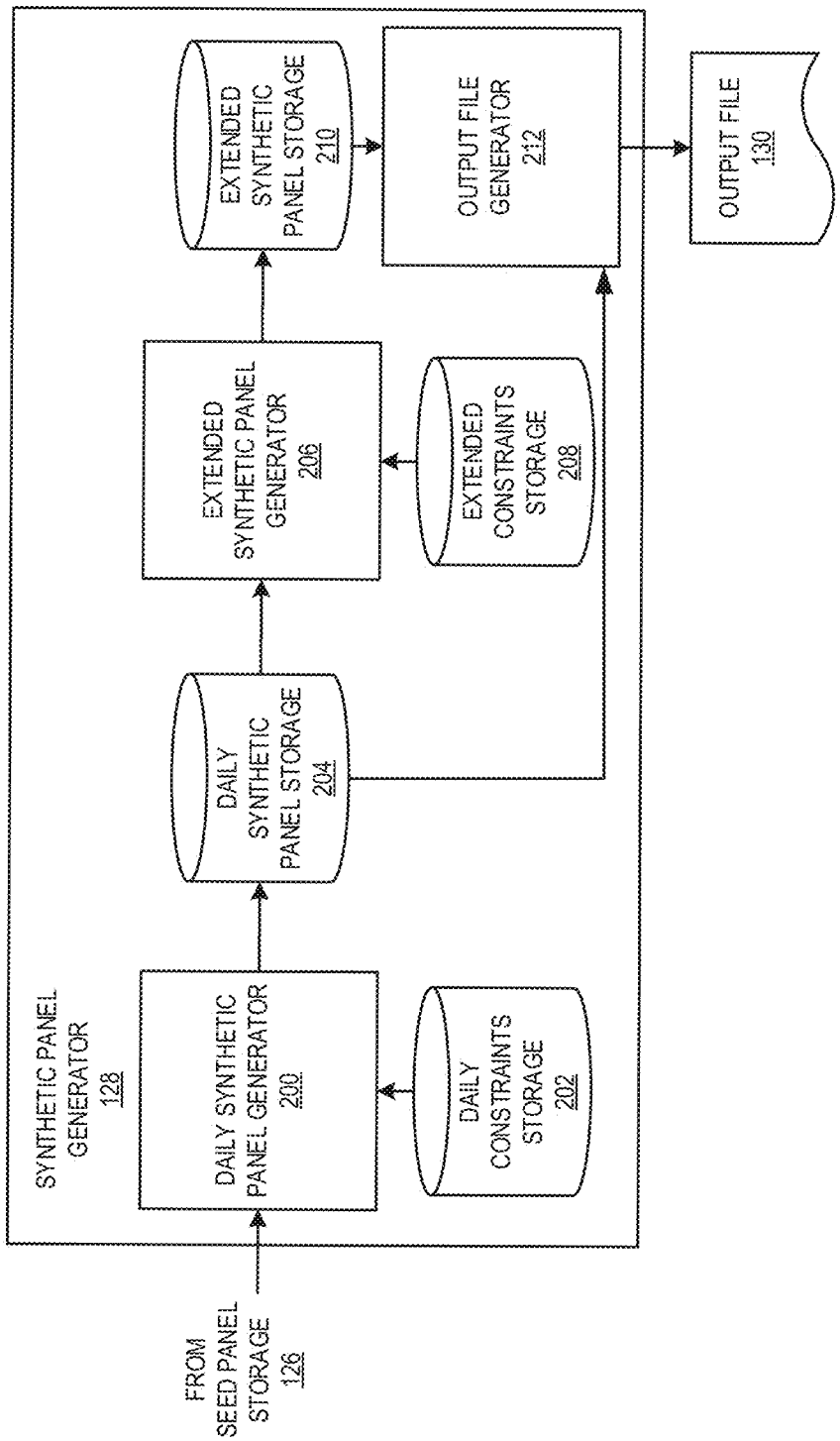
FIG. 2 is a block diagram of an example implementation of an example synthetic panel generator of FIG. 1.

FIG. 2 is a block diagram of an example implementation of the example synthetic panel generator 128 of FIG. 1 to generate the example output file 130 including synthetic respondent level data based on the seed panel and aggregate level constraints. The example synthetic panel generator 128 includes an example daily synthetic panel generator 200, example daily constraints storage 202, example daily synthetic panel storage 204, an example extended synthetic panel generator 206, example extended constraints storage 208, example extended synthetic panel storage 210, and an example output file generator 212.

The example daily synthetic panel generator 200 of FIG. 2 receives the seed panel from the example seed panel storage 122 and generates a daily synthetic panel based on daily constraints from the example daily constraints storage 202. In some examples, the daily synthetic panel generator 200 may generate a synthetic panel according to a different duration of time (e.g., an hour, a half day, etc.) based on constraints corresponding to that duration of time. As described above, the daily constraints include input reach constraints for the day based on aggregated return path data. For example, the daily constraints may include a total number of viewers (e.g., based on return path data from a particular market, geographic area, etc.) that were exposed to programs, channels in a channel lineup, networks, etc., within the day. Accordingly, the daily synthetic panel generator 200 generates daily synthetic panels based on return path data reported by a plurality of media devices, where the daily synthetic panels are representative of audiences of media provided by the plurality of media devices during a particular day. The example daily synthetic panel generator 200 generates a daily synthetic panel such that the daily synthetic panel, when weighted, corresponds to the daily constraints. In this manner, the weighted daily synthetic panel correspond to the aggregate data of the day. The example daily synthetic panel generator 200 generates the synthetic panelists and their viewing data based on a transition matrix and an iterative reduction of panelists based on weights that satisfy a threshold. The example daily synthetic panel generator 200 is further described below in conjunction with FIG. 3. The example daily synthetic panel generator 200 stores the daily synthetic panels in the example daily synthetic panel storage 204.

The example extended synthetic panel generator 206 of FIG. 2 generates an extended synthetic panel corresponding to an extended duration of time (e.g., a duration of time longer than a day) based on (A) extended constraints stored in the example extended constraints storage 208 and (B) the daily synthetic panels (e.g., stored in the example daily synthetic panel storage 204) corresponding the extended duration of time. For example, the extended synthetic panel generator 206 may generate a weekly synthetic panel, a biweekly synthetic panel, a monthly synthetic panel, etc. The example extended constraints include aggregate data (e.g., reach corresponding to the extended duration of time as determined from the return path data). The example extended synthetic panel generator 206 generates the extended synthetic panel by linking panelists in the daily synthetic panel across the extended duration of time. Because the daily panelists that make up the daily synthetic panels may be different for different days, the example extended synthetic panel generator 206 links the panelist in the daily panels across all the daily panels in the extended period to generate the extended synthetic panel within a demographic (e.g., location, age, gender, ethnicity, etc.). For example, the extended synthetic panel generator 206 may link (e.g., associate) a first panelist from a first daily synthetic panel to a second panelist from a second daily synthetic panel, a third panelist from a third daily synthetic panel, etc., where the first panelist, second panelist, third panelist, etc., represent one or more persons of a demographic in the extended duration of time, but are not necessarily the same seed panelist but are used to represent the same synthetic panelist across the extended duration of time. To determine an optimal panelist linkage across the extended duration of time, the example extended synthetic panel generator 206 calculates a constraint error for panelist links for different days of the extended duration of time. The example extended synthetic panel generator 206 tests all possible link permutations for panelists within a demographic group for different days of the extended duration of time and selects the synthetic panelist links that correspond to the lowest constraint error. The example extended synthetic panel generator 206 is further described below in conjunction with FIG. 4. The example extended synthetic panel generator 206 stores the daily synthetic panels in the example extended synthetic panel storage 210.

The example output file generator 212 of FIG. 2 gathers the daily synthetic panels from the example daily synthetic panel storage 204 and/or extended synthetic panel storage from the example extended synthetic panel storage 210 to generate the example output file 130. The example output file generator 212 generates the output file 130 to include synthetic respondent level data including at least one of detailed demographic data of the synthetic panel, synthetic respondent level attributes, quarter hour ratings calculated from the synthetic respondent level data, daypart ratings calculated from the synthetic respondent level data, daypart reach calculated from the synthetic respondent level data, etc. As described above, such data may be used to generate a report and/or may be further processed by a device (e.g., to estimate data related to the universe of users).

Figure 3:
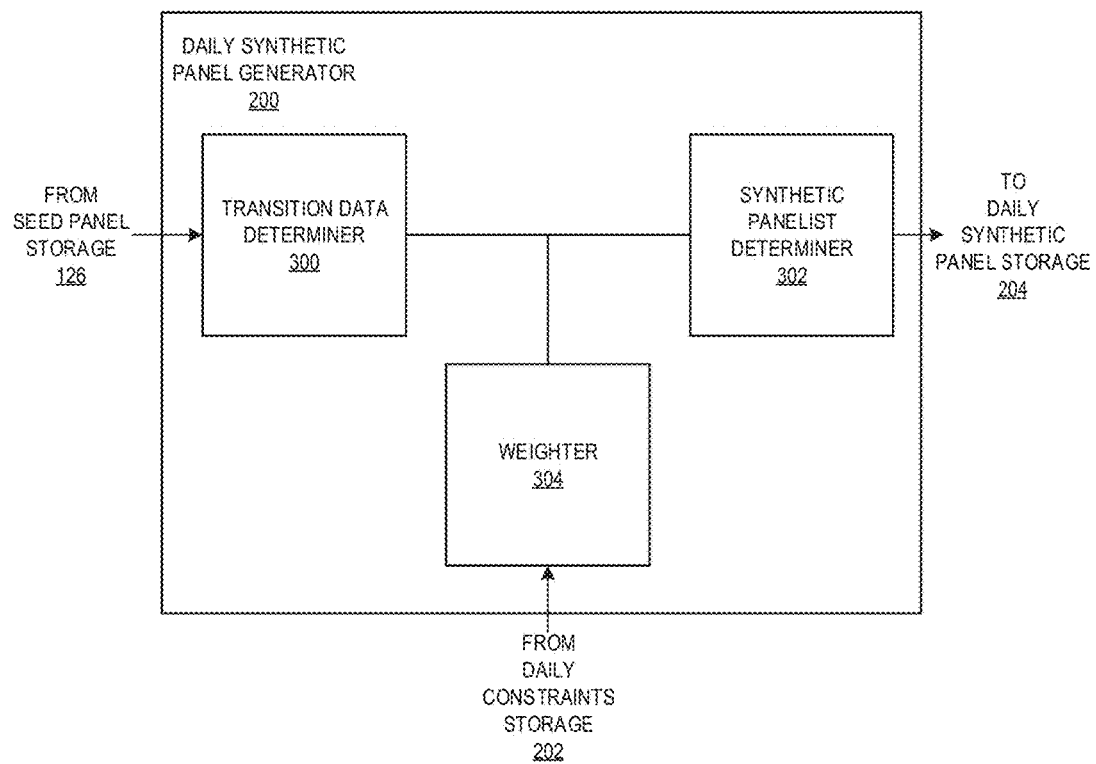
FIG. 3 is a block diagram of an example implementation of an example daily synthetic panel generator of FIG. 2.

FIG. 3 is block diagram of an example implementation of the example daily synthetic panel generator 200 of FIG. 2 to generate a synthetic panel corresponding to a first duration of time (e.g., a day). The example daily synthetic panel generator 200 includes an example transition data determiner 300, an example synthetic panelist determiner 302, and an example weighter 304.

The example transition data determiner 300 of FIG. 3 generates a transition matrix representative of the probability of seed panelists changing from a first media (e.g., a first channel) to a second media (e.g., a second channel) for different quarter hours of the day based on the seed panel stored in the example seed panelist storage 126 of FIG. 1. The example transition data determiner 300 generates a transition matrix per quarter hour. According, the example transition data determiner 300 generates 96 transition matrices for a daily synthetic panel.

The example synthetic panelist determiner 302 of FIG. 3 generates initial synthetic panelists based on the transition matrix generated by the example transition data determiner 300. The example synthetic panelist determiner 302 selects an initial number of synthetic panelist and generates viewing data for the initial number of synthetic panelists. To initialize the viewing data, the example synthetic panelist determiner 302 randomly picks a station (e.g., channel) that is viewed for the first quarter hour for a first synthetic panelist. In some examples, the initial station is picked based on an expected distribution of stations at the first quarter hour. The example synthetic panelist determiner 302 uses the data in the generated transition matrix (e.g., the probability that a panelist will switch to a second channel) to determine which channel the first synthetic panelist is viewing at a second quarter hour, a third quarter hour, . . . , and a ninety-sixth quarter hour (e.g., making up the viewing data for the first synthetic panelist for the day). This process is repeated for other synthetic panelists until the example synthetic panelist determiner 302 generates the viewing data for the initial number of the synthetic panelists. Once, the viewing data for the synthetic panelists have been generated, the viewing data may not correspond (e.g., match) the daily constraints (e.g., the daily reach) from the example daily constraints storage 202. As further described below, the example weighter 304 weights the viewing data of the synthetic panelists so that the viewing data better matches the daily constraints. Additionally, after the synthetic panelist determiner 302 determines a final synthetic panel (e.g., based on the below described technique), the synthetic panelist determiner 302 stores the daily synthetic panel including the viewing data in the example daily synthetic panel storage 204.

Figure 4:
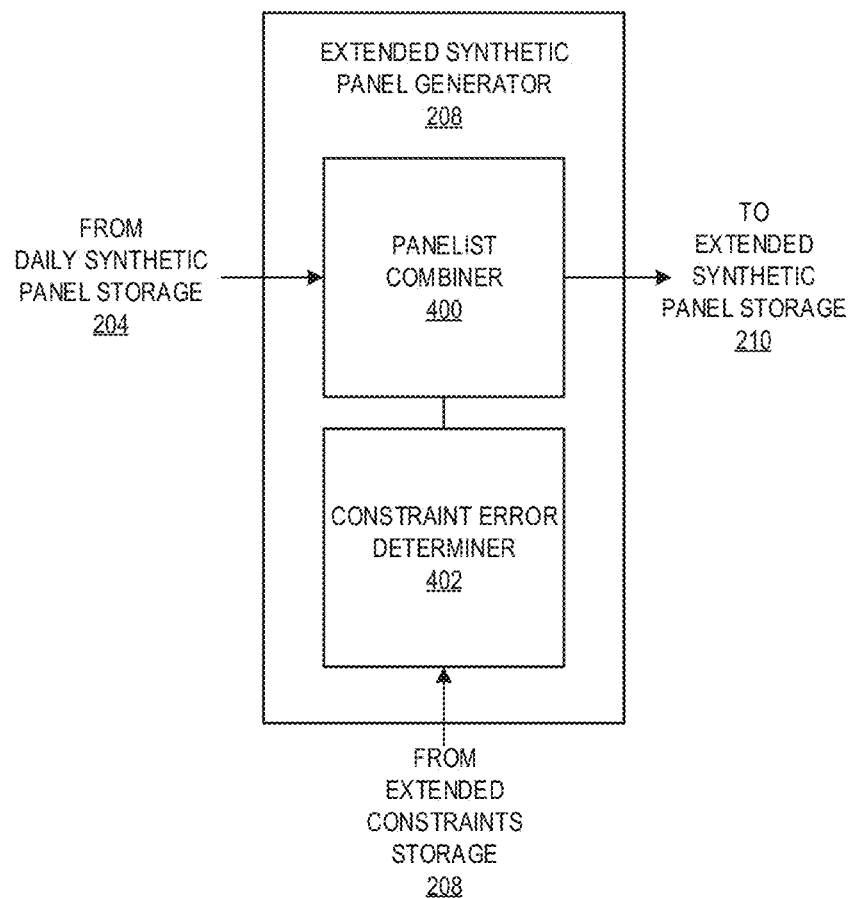
FIG. 4 is a block diagram of an example implementation of an example extended synthetic panel generator of FIG. 2.

The example weighter 304 of FIG. 4 performs iterative proportional fitting to determine weights for the viewing data of the initial synthetic panel so that the weighted viewing data matches the aggregate reach constraints. After the example weighter 304 weights the viewing of initial synthetic panel, the synthetic panel may still not match the daily constraints from the example daily constraint storage 202 of FIG. 2. Accordingly, the example synthetic panelist determiner 302 removes initial synthetic panelists (and corresponding demographic and viewing data) whose weights are below a minimum weight threshold (e.g., corresponding to synthetic panelists that don't match well with the constraints). The example weighter 304 reweighs the reduced synthetic panel and the process repeats until the weights converge, thereby generating the final daily synthetic panel that matches the daily constraints (e.g., the best fit or sample of panelists that satisfy the daily constraints). The sum of the resulting weights is constant from day to day. Accordingly, the resulting daily synthetic panel for each day with have the same number of divided panelists from day to day.

FIG. 4 is block diagram of an example implementation of the example extended synthetic panel generator 206 of FIG. 2 to generate an extended synthetic panel. The example extended synthetic panel generator 206 includes an example panelist combiner 400 and an example constraint error determiner 402.

The example panelist combiner 400 of FIG. 4 gathers daily synthetic panels corresponding to an extended duration of time (e.g., a duration of time made up of any number of days). As described above, the synthetic panelists used in a first daily synthetic panel may not be the same synthetic panelists used in a second daily synthetic panel. Accordingly, the example panelist combiner 400 links (e.g., combines) panelists from daily synthetic panels across the extended duration of time. The example panelist combiner 400 may first determine the demographics of the daily synthetic panelists and group the panelists by a demographic (e.g., age, gender, location, ethnicity, etc.). The example panelist combiner 400 may link panelists whose demographic matches. In some examples, the panelist combiner 400 equalizes the weights of the panelists prior to linking the panelists across days. The panelist combiner 400 equalizes the weights to ensure that the same number of panelists are linked across days. Additionally, the linking optimization is simplified when the weights are equalized.

To generate the links, the example panelist combiner 400 of FIG. 4 determines possible permutations of synthetic panelist links within a demographic group between a first day and a second day. Once the permutations have been determined, the example constraint error determiner 402 determines the constraint error of different permutations of the synthetic panelist links (e.g., based on the return path data). In some examples, the constraint error determiner 402 determines the constraint error by calculating a first reach corresponding to the synthetic panelist link and compares (e.g., subtracts) the first reach determined by combining viewing data for synthetic panelist according to synthetic panelist links to a second reach corresponding to the aggregate data (e.g., a target reach) based on the return path data in the example extended constraints storage 208. The example panelist combiner 400 links the panelist based on the permutations with the smallest constraint error. Once the example panelist combiner 400 determines the panelist links for the first and second day, the process repeats for a third day, a fourth day, etc. until the panelists are linked across all days in the extended duration of time. In some examples, if the constraint error is not zero or below a maximum error threshold, the process repeats until the extended constraint error is properly minimized. Once the extended constraint error is minimized or otherwise reduced, the example panelist combiner 400 stores the extended synthetic panel (e.g., including corresponding demographic data and viewing data) in the example extended synthetic panel storage 210.

While an example manner of implementing the example synthetic panel generator 128 of FIG. 1 is illustrated in FIGS. 2-4, one or more elements, processes and/or devices illustrated in FIGS. 2-4 may be combined, divided, rearranged, omitted, eliminated and/or implemented in any other way. Further, the example daily synthetic panel generator 200, the example extended synthetic panel generator 206, the example output file generator 212, the example transition data determiner 300, the example synthetic panelist determiner 302, the example weighter 304, the example panelist combiner 400, the example constraint error determiner 402, and/or, more generally, the example the example panelist replicator 212, of FIGS. 2-4 may be implemented by hardware, machine readable instructions, software, firmware and/or any combination of hardware, machine readable instructions, software and/or firmware. Thus, for example, any of the example daily synthetic panel generator 200, the example extended synthetic panel generator 206, the example output file generator 212, the example transition data determiner 300, the example synthetic panelist determiner 302, the example weighter 304, the example panelist combiner 400, the example constraint error determiner 402, and/or, more generally, the example the example panelist replicator 212, of FIGS. 2-4 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example daily synthetic panel generator 200, the example extended synthetic panel generator 206, the example output file generator 212, the example transition data determiner 300, the example synthetic panelist determiner 302, the example weighter 304, the example panelist combiner 400, the example constraint error determiner 402, and/or, more generally, the example the example panelist replicator 212, of FIGS. 2-4 is/are hereby expressly defined to include a tangible computer readable storage device or storage disk such as a memory, a digital versatile disk (DVD), a compact disk (CD), a Blu-ray disk, etc., storing the software and/or firmware. Further still, the example synthetic panel generator 128 of FIGS. 2-4 may include one or more elements, processes and/or devices in addition to, or instead of, those illustrated in FIGS. 2-4, and/or may include more than one of any or all of the illustrated elements, processes and devices.

Figure 5:
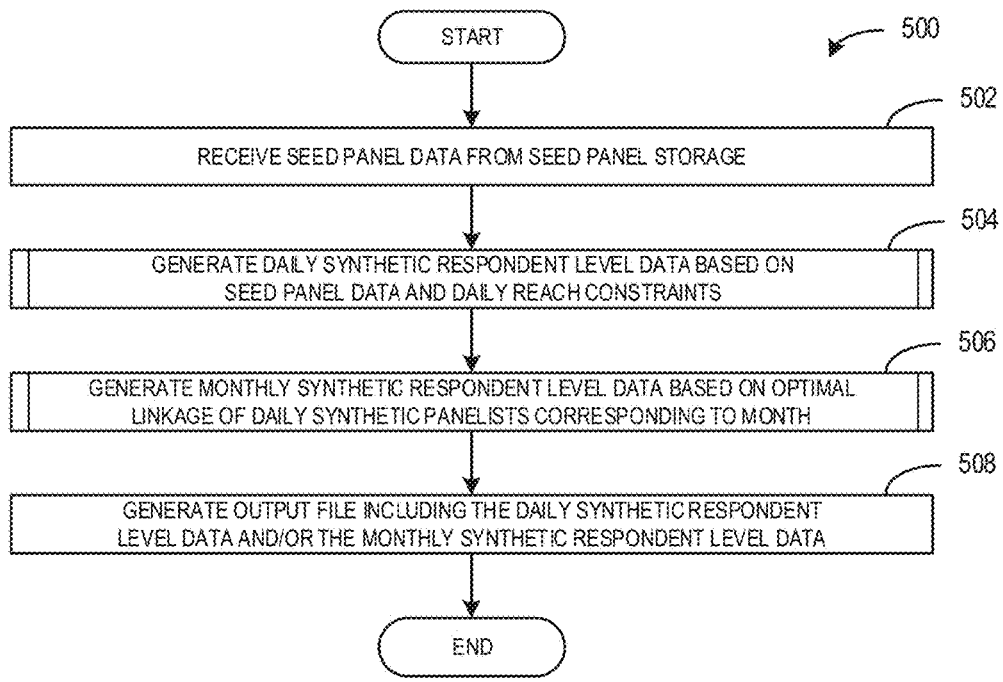
FIGS. 5-7 are flowcharts illustrating example machine readable instructions that may be executed to implement the example synthetic panel generator of FIGS. 1 and/or 2.
Figure 6:
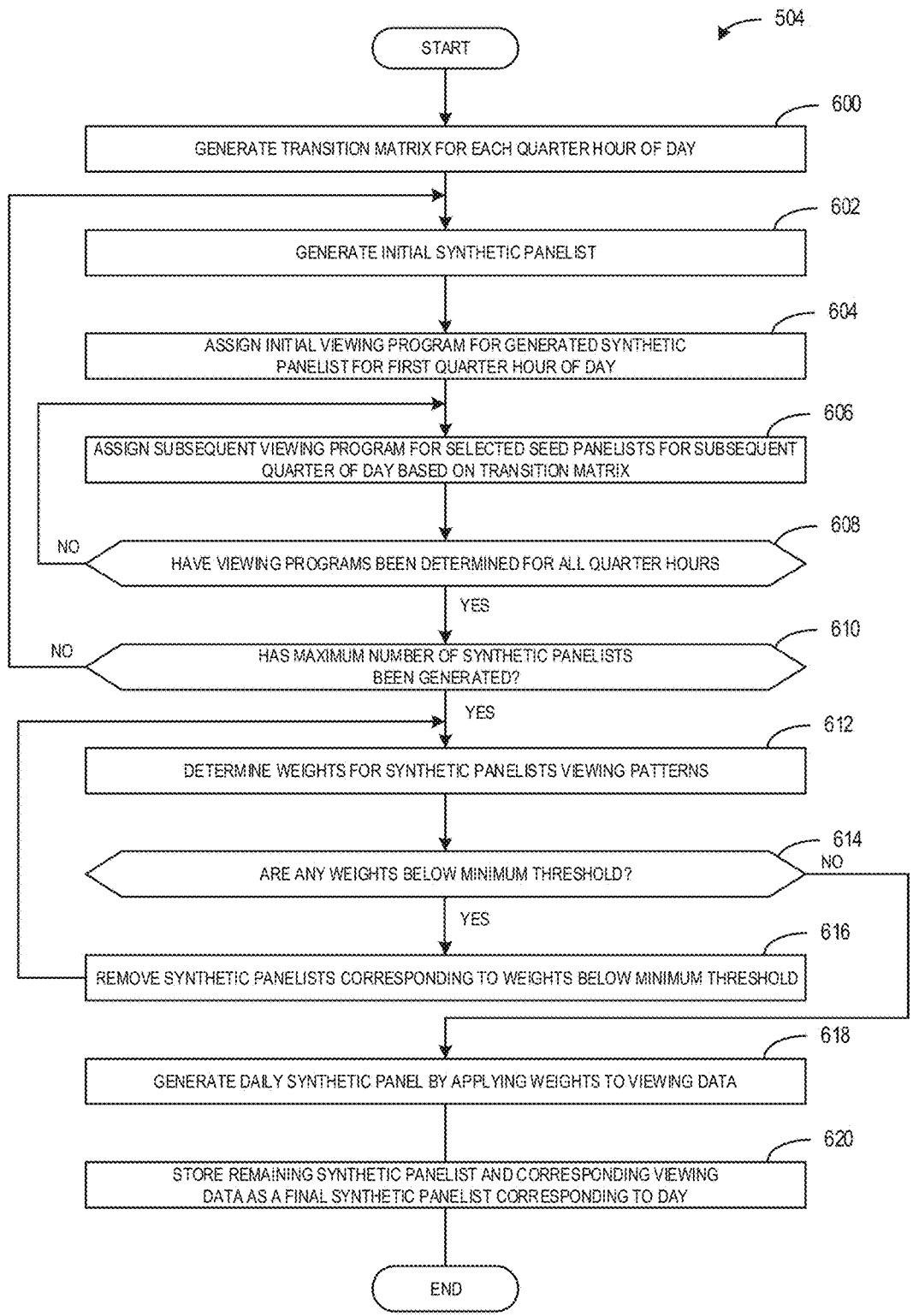
Figure 7:
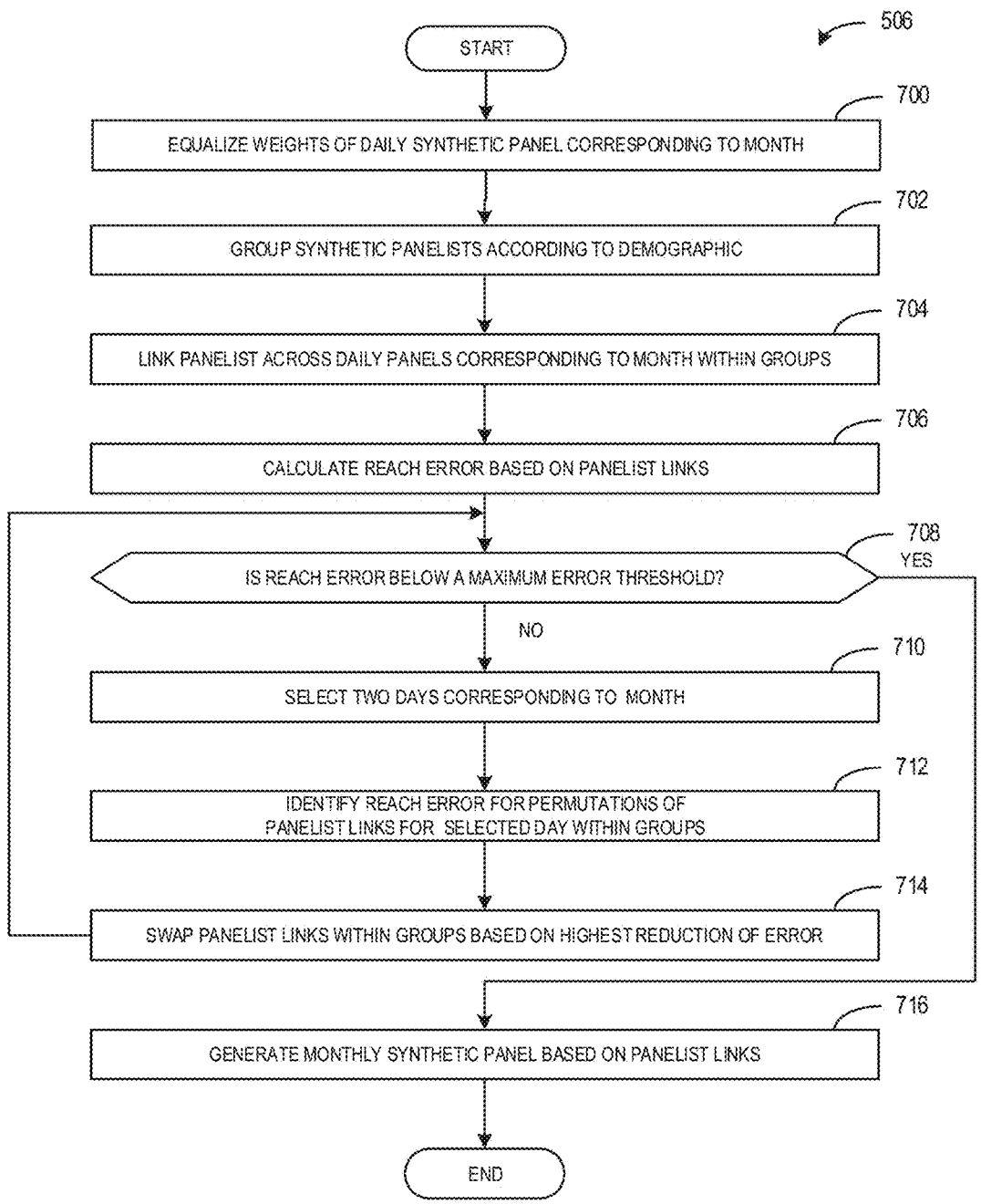

Flowcharts representative of example machine readable instructions for implementing the example synthetic panel generator 128 of FIGS. 2-4 are shown in FIGS. 5-7. In the examples, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5-7, many other methods of implementing the example synthetic panel generator 128 of FIGS. 2-4 may alternatively be used. For example, the order of execution of the blocks may be changed, and/or some of the blocks described may be changed, eliminated, or combined.

As mentioned above, the example process of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any period (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any period (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is an example flowchart 500 representative of example machine readable instructions that may be executed by the example synthetic panel generator 128 of FIGS. 1 and 2 to generate the example output file 130 to include synthetic respondent level data. Although the instructions of FIG. 5 are described in conjunction with the example synthetic panel generator 128 of FIGS. 1 and 2, the example instructions may be utilized by any type of synthetic panel generator. Although, the flowcharts 500, 504, 506 of FIGS. 5, 6, and 7 are described in conjunction with generating synthetic respondent level data corresponding to daily and monthly durations, the synthetic respondent level data may correspond to any durations of time.

At block 502, the example daily synthetic panel generator 200 receives seed panel data from the example seed panel storage 126 of FIG. 1. At block 504, the example daily synthetic panel generator 200 generates daily synthetic respondent level data based on the received seed panel data and daily reach constraints. The generation of the daily synthetic respondent level data is further described below in conjunction with FIG. 6. At block 506, the example extended synthetic panel generator 206 generates monthly synthetic respondent level data based on an optimal linkage (e.g., a linkage that reduces constraint error) of daily synthetic panelists corresponding to a month. The generation of monthly synthetic respondent level data is further described below in conjunction with FIG. 7. At block 508, the example output file generator 212 generate the example output file 130 including the daily synthetic respondent level data and/or the monthly synthetic respondent level data.

FIG. 6 is an example flowchart 504 representative of example machine readable instructions that may be executed to implement the example daily synthetic panel generator 200 of the example synthetic panel generator 128 of FIG. 2 to generate daily synthetic respondent level data based on seed panel data and daily reach constraints, as described above in conjunction with block 504 of FIG. 5. Although the instructions of FIG. 5 are described in conjunction with the example daily synthetic panel generator 200 of FIG. 2, the example instructions may be utilized by any type of daily synthetic panel generator.

At block 600, the example transition data determiner 300 generates a transition matrix for quarter hours for a first duration of time (e.g., a day). As further described above in conjunction with FIG. 2, the transition matrix is based on the seed panel and represents the probability that a panelist will change channels, stations, progress, etc. in a given quarter hour. At block 602, the example synthetic panelist determiner 302 generates an initial synthetic panelist. At block 604, the example synthetic panelist determiner 302 assigns an initial viewing program for the generated synthetic panelist for first quarter hour of the day. In some examples, the synthetic panelist determiner 302 assigns the initial viewing program based on an expected distribution of programs at the first quarter hour.

At block 606, the example synthetic panelist determiner 302 assigns a subsequent viewing program for the generate synthetic panelist for a subsequent quarter hour of the day based on the transition matrix. The example synthetic panelist determiner 302 may generate a randomly select a program based on the transition matrix for the first quarter hour that identifies the probability that a panelist will change the program to a different program. For example, if the transition matrix corresponds to a 50% chance that a person watching NBC at the beginning of the first quarter hour will remain on NBC during the entire first quarter hour, a 30% chance that the person will change to ABC during the first quarter hour, and a 20% chance that the person will change to CBS during the first quarter hour and the first synthetic panelist has been initialized as watching NBC, the example synthetic panelist determiner 302 will randomly select a viewing program for the first quarter, where the randomly selected viewing program has a 50% chance of being NBC, a 30% chance of being ABC, and a 20% chance of being CBS.

At block 608, the example synthetic panelist determiner 302 determines if the viewing programs have been determined for all quarter hours for the synthetic panelist. If the example synthetic panelist determiner 302 determines that the viewing programs have not been determined for all quarter hours (block 608: NO), the process returns to block 606 to determine viewing programs for subsequent quarter hours. If the example synthetic panelist determiner 302 determines that the viewing programs have been determined for all quarter hours (block 608: YES), the example synthetic panelist determiner 302 determines if the maximum number of synthetic panelists has been generated (block 610).

If the example synthetic panelist determiner 302 determines that the maximum number of synthetic panelists has not been generated (block 610: NO), the process returns to block 602 to generate a subsequent synthetic panelist until the maximum number of synthetic panelists has been generated. If the example synthetic panelist determiner 302 determines that the maximum number of synthetic panelists has been generated (block 610: YES), the example weighter 304 determines weights for the synthetic panelists viewing patterns (e.g., assigned viewing data at the different quarter hours) (block 612). The example weighter 304 weights the synthetic panelists to correspond to the daily constraints. As described above, the example weighter 304 may determine the weights by performing an iterative proportional fitting operation.

At block 614, the example synthetic panelist determiner 302 determines if any of the determined weights are below a minimum threshold. Low weights (e.g., below a minimum threshold) correspond to synthetic panelists that are not good fits for the daily constraints. If the example synthetic panelist determiner 302 determines that there is a determined weight(s) below the minimum threshold (block 614: YES), the example synthetic panelist determiner 302 removes the synthetic panelists corresponding to weights below the minimum threshold (block 616). In this manner, the remaining synthetic panelists correspond to a better fit for the daily constraints. The process returns to block 612 to reweigh the remaining panelists and/or remove additional panelists until the remaining panelists corresponds to weights above the minimum threshold.

If the example synthetic panelist determiner 302 determines that there are no determined weights below the minimum threshold (block 614: NO), the example weighter 304 generates daily synthetic panel by applying the weights to the viewing data of the remaining synthetic panelists (block 618). At block 620, the example daily synthetic panel storage 204 (FIG. 2) stores the remaining synthetic panelists (including demographics of the remaining synthetic panelists) and corresponding viewing data as a final synthetic panelist corresponding to the day (e.g., daily synthetic respondent level data).

FIG. 7 is an example flowchart 506 representative of example machine readable instructions that may be executed to implement the example extended synthetic panel generator 206 of the example synthetic panel generator 128 of FIG. 4 to generate monthly synthetic respondent level data based on an optimal synthetic panel linkage of the daily synthetic panelists corresponding to the month, as described above in conjunction with block 506 of FIG. 5. Although the instructions of FIG. 5 are described in conjunction with the example extended synthetic panel generator 206 of FIG. 2, the example instructions may be utilized by any type of daily synthetic panel generator. Additionally, although the instructions of FIG. 5 are described in conjunction with the extended period of time being a month, any duration of time longer than a day may be used for the extended period of time.

At block 700, the example panelist combiner 400 equalizes the weights of the daily synthetic panel corresponding to a month. At block 702, the example panelist combiner 400 groups synthetic panelists according to a demographic and are used to represent a same synthetic panelist across the monthly duration. The demographic may be based on user and/or manufacture preferences. For example, the demographic may be location of the synthetic panelist. Accordingly, the example panelist combiner 400 groups the synthetic panelists of daily synthetic panels according to location (e.g., by state or city, for example).

At block 704, the example panelist combiner 400 links panelists across daily panels corresponding to the month within the demographic groups. For example, a first synthetic panelist in a first daily panel is linked to a second synthetic panelist in a second daily panel, a third panelist in a third synthetic panel, etc., where the first, second, and third panelist correspond to the same demographic. At block 706, the example constraint error determiner 402 calculates the monthly reach error (e.g., a monthly constraint error) based on the panelist links across the daily panels corresponding to the month. The example constraint error determiner 402 calculates the monthly reach error by combining (e.g., subtracting) the monthly reach corresponding to the synthetic panelist links and the actual monthly reach constraint (e.g., the closer the difference is to zero, the lower the error). In some examples, when the initial panelist links are selected arbitrarily, the monthly reach error is relatively high.

At block 708, the example constraint error determiner 402 determines if the monthly reach error is below a maximum error threshold. The maximum error threshold is the maximum allowable error for the monthly reach and may be determined based on user and/or manufacture preferences. In some examples, the maximum error threshold is zero. If the example constraint error determiner 402 determines that the monthly reach error is not below a maximum error threshold (block 708: NO), the example panelist combiner 400 selects two days corresponding to the month (e.g., a first and second day of the month) (block 710).

At block 712, the example constraint error determiner 402 identifies reach error for the different permutations of panelists links for the selected days within the demographic groups. For example, the example constraint error determiner 402 calculates a first error for a first link between a first synthetic panelist in the first daily panel and a second synthetic panelist in the second daily panel (e.g., the initial panelist link) and calculates a second error for a second link between the first synthetic panelist in the first daily panel and a third synthetic panelist in the second daily panel, where the first, second, and third panelists correspond to the same demographic.

At block 714, the example panelist combiner 400 swaps panelist links within demographic groups based on the highest reduction of error. Using the above example, if the second link reduces the error more than the first link, the example panelist combiner 400 swaps the panelists links so that the first synthetic panelist of the first synthetic panel is now linked to the third synthetic panelist of the second synthetic panel. The process returns to block 708 and is rerun for different daily panels until the optimal synthetic panelist links are formed (e.g., the synthetic panelist links that reduce the reach error below the maximum error threshold). If the example constraint error determiner 402 determines that the monthly reach error is below a maximum error threshold (block 708: YES), the example panelist combiner 400 generates a monthly synthetic panel based on the panelist links that corresponding with a reach error below the maximum error threshold (block 716).

Figure 8:
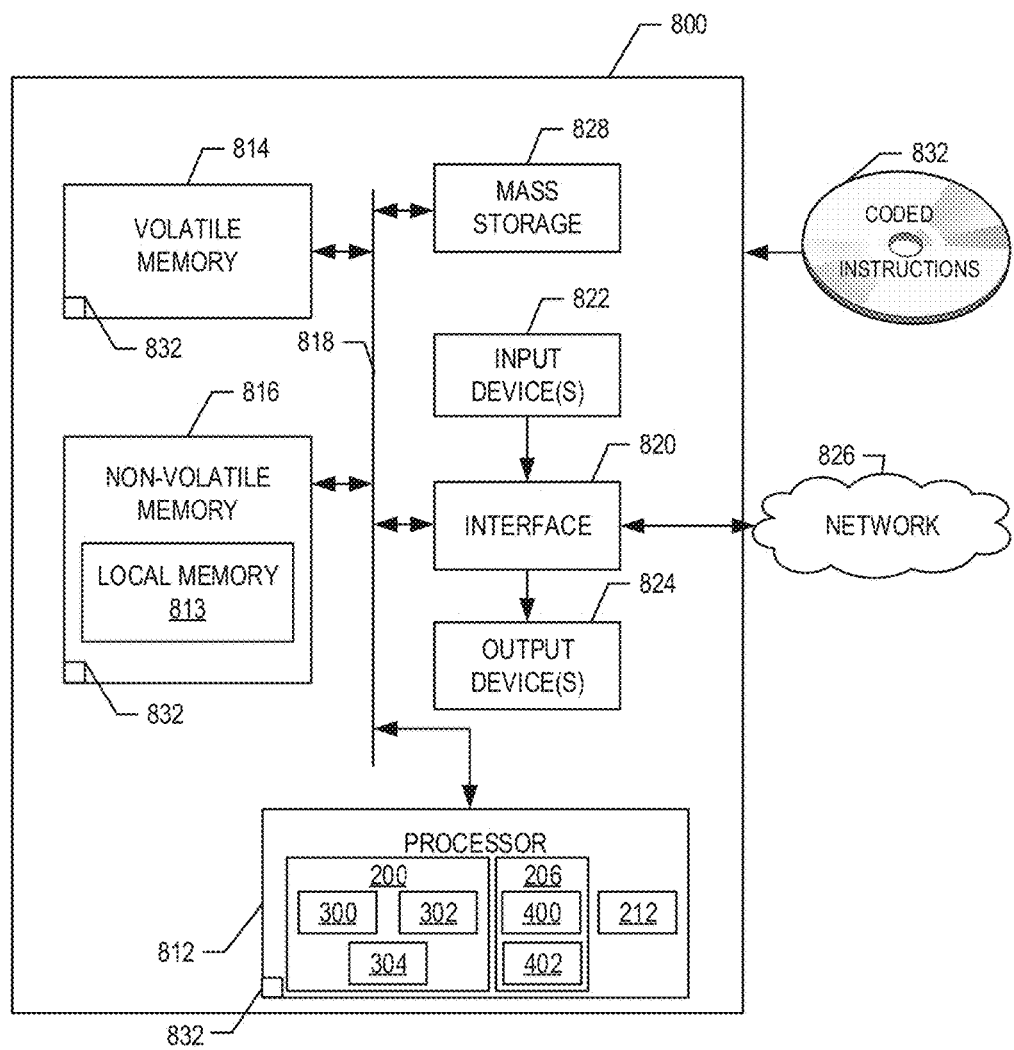
FIG. 8 is a block diagram of an example processing system structured to execute the example machine readable instructions of FIGS. 5-7 to implement the example synthetic panel generator of FIGS. 1 and/or 2.

FIG. 8 is a block diagram of an example processor platform 800 capable of executing the instructions of FIGS. 5-7 to implement the example synthetic panel generator 128 of FIG. 1. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by integrated circuits, logic circuits, microprocessors or controllers from any desired family or manufacturer.

The processor 812 of the illustrated example includes a local memory 813 (e.g., a cache). The example processor 812 of FIG. 8 executes the instructions of FIGS. 5-7 to the example daily synthetic panel generator 200, the example extended synthetic panel generator 206, the example output file generator 212, the example transition data determiner 300, the example synthetic panelist determiner 302, the example weighter 304, the example panelist combiner 400, and/or the example constraint error determiner 402 to implement the example synthetic panel generator 128 of FIG. 2. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 820 of the illustrated example, thus, typically includes a graphics driver card, a graphics driver circuit or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5-7 may be stored in the mass storage device 828, in the volatile memory 814, in the non-volatile memory 816, and/or on a removable tangible computer readable storage medium such as a CD or DVD.

From the foregoing, it should be appreciated that the above disclosed methods, apparatus, and articles of manufacture generate synthetic respondent level data. Example disclosed herein process the collected and/or aggregated metering data for markets where a panel is maintained and collect and/or aggregate return path data for markets where a panel is not maintained to generate a seed panel. Once a seed panel has been generated, examples disclosed herein generate a transition matrix corresponding to the seed panel. The transition matrix is used to generate viewing data for an initial daily synthetic panel that is adjusted based on daily constraints. Examples disclosed herein determine extended (e.g., weekly, monthly) synthetic respondent level data by linking synthetic panelists from daily synthetic panels for the extended time period. The synthetic panelist links are optimized to satisfy target monthly reach. Using examples disclosed herein, consistent respondent level data is generated that satisfy various constraints, thereby providing more accurate universe estimations.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a daily synthetic panel generator to generate, by executing an instruction with a processor, a first synthetic panel corresponding to a first duration of time and a second synthetic panel corresponding to a second duration of time, the first synthetic panel being based on (a) a seed panel and (b) first duration constraints based on return path data reported by a plurality of media devices, the second synthetic panel being based on (a) the seed panel and (b) second duration constraints based on the return path data reported by the plurality of media devices, the first synthetic panel representative of audiences of media presented by the plurality of media devices during the first duration of time, the second synthetic panel representative of audiences of media presented by the plurality of media devices during the second duration of time;
an extended synthetic panel generator to generate, by executing an instruction with the processor, synthetic respondent level data corresponding to a third duration of time by linking first synthetic panelists in the first synthetic panel to second synthetic panelist in the second synthetic panel; and
an output file generator to generate an output file based on the synthetic respondent level data.

2. The apparatus of claim 1, wherein the daily synthetic panel generator is to generate the first synthetic panel by:
generating a transition matrix corresponding to the first and second durations of time, the transition matrix being based on the seed panel;
generating viewing data for the first synthetic panelists corresponding to the first and second durations of time, the viewing data being generated using the transition matrix;
determining weights to apply to the viewing data for the first synthetic panelists to satisfy the first duration constraints; and
removing one or more of the first synthetic panelists whose weights do not satisfy a minimum threshold.

3. The apparatus of claim 2, wherein the transition matrix corresponds to a probability that a panelist will change stations during a quarter hour.

4. The apparatus of claim 2, wherein the first synthetic panelists are reweighted after the one or more of the first synthetic panelists have been removed.

5. The apparatus of claim 1, wherein the first duration constraints include reaches for the first duration corresponding to aggregate reach data determined based on the return path data.

6. The apparatus of claim 5, wherein the extended synthetic panel generator is to generate the synthetic respondent level data corresponding to the third duration of time by:
determining a duration constraint error corresponding to a comparison of a first reach for the second duration determined by combining viewing data for synthetic panelists according to the synthetic panelist links and a second reach for the second duration corresponding to aggregate reach data determined based on the return path data; and
when the duration constraint error does not satisfy an error threshold, swapping the synthetic panelist links to reduce the duration constraint error.

7. The apparatus of claim 6, wherein the swapping of the synthetic panelist links includes:
identifying the duration constraint error for permutations of panelist links between the first synthetic panel and the second synthetic panel; and
swapping the synthetic panelist links based on a highest reduction of the duration constraint error.

8. The apparatus of claim 1, wherein the synthetic panelists are linked according to a demographic.

9. The apparatus of claim 1, wherein the first duration of time corresponds to a first day, the second duration of time corresponds to a second day, and the third duration of time corresponds to a duration of time including the first and second days.

10. A method comprising:
generating, by executing an instruction with a processor, a first synthetic panel corresponding to a first duration of time and a second synthetic panel corresponding to a second duration of time, the first synthetic panel being based on a (a) seed panel and (b) first duration constraints based on return path data reported by a plurality of media devices, the second synthetic panel being based on (a) the seed panel and (b) second duration constraints based on the return path data reported by the plurality of media devices, the first synthetic panel representative of audiences of media presented by the plurality of media devices during the first duration of time, the second synthetic panel representative of audiences of media presented by the plurality of media devices during the second duration of time;
generating, by executing an instruction with the processor, synthetic respondent level data corresponding to a third duration of time by linking first synthetic panelists in the first synthetic panel to second synthetic panelist in the second synthetic panel; and
generating an output file based on the synthetic respondent level data.

11. The method of claim 10, wherein the generating of the first synthetic panel includes:
generating a transition matrix corresponding to the first and second durations of time, the transition matrix being based on the seed panel;
generating viewing data for the first synthetic panelists corresponding to the first and second durations of time, the viewing data being based on the transition matrix;
determining weights to apply to the viewing data for the first synthetic panelists to satisfy the first duration constraints; and
removing one or more of the first synthetic panelists whose weights do not satisfy a minimum threshold.

12. The method of claim 11, wherein the transition matrix corresponds to a probability that a panelist will change stations during a quarter hour.

13. The method of claim 11, wherein the first synthetic panelists are reweighted after the one or more of the first synthetic panelists have been removed.

14. The method of claim 10, wherein the first duration constraints include reaches for the first duration corresponding to aggregate reach data determined based on the return path data.

15. The method of claim 14, wherein the generating of the synthetic respondent level data corresponding to the third duration of time includes:
determining a duration constraint error corresponding to a comparison of a first reach for the second duration determined by combining viewing data for synthetic panelists according to the synthetic panelist links and a second reach for the second duration corresponding to aggregate reach data determined based on the return path data; and when the duration constraint error does not satisfy an error threshold, swapping the synthetic panelist links to reduce the duration constraint error.

16. The method of claim 15, wherein the swapping of the synthetic panelist links includes:

identifying the duration constraint error for permutations of panelist links between the first synthetic panel and the second synthetic panel; and swapping the synthetic panelist links based on a highest reduction of the duration constraint error.

17. The method of claim 10, wherein the synthetic panelists are linked according to a demographic.

18. The method of claim 10, wherein the first duration of time corresponds to a first day, the second duration of time corresponds to a second day, and the third duration of time corresponds to a duration of time including the first and second days.

19. A tangible computer readable storage medium comprising instructions which, when executed, cause a machine to at least:

generate, by executing an instruction with a processor, a first synthetic panel corresponding to a first duration of time and a second synthetic panel corresponding to a second duration of time, the first synthetic panel being based on (a) a seed panel and (b) first duration constraints based on return path data reported by a plurality of media devices, the second synthetic panel being based on (A) the seed panel and (b) second duration constraints based on the return path data reported by the plurality of media devices, the first synthetic panel representative of audiences of media presented by the plurality of media devices during the first duration of time, the second synthetic panel representative of audiences of media presented by the plurality of media devices during the second duration of time;

generate, by executing an instruction with the processor, synthetic respondent level data corresponding to a third duration of time by linking first synthetic panelists in the first synthetic panel to second synthetic panelist in the second synthetic panel; and generate an output file based on the synthetic respondent level data.

20. The computer readable storage medium of claim 19, wherein the instructions cause the machine to generate the first synthetic panel by:

generating a transition matrix corresponding to the first and second durations of time, the transition matrix being based on the seed panel;

generating viewing data for the first synthetic panelists corresponding to the first and second durations of time, the viewing data being based on the transition matrix;

determining weights to apply to the viewing data for the first synthetic panelists to satisfy the first duration constraints; and removing one or more of the first synthetic panelists whose weights do not satisfy a minimum threshold.

* * * * *